United States Patent [19]
Öhlin et al.

[11] Patent Number: 5,326,129
[45] Date of Patent: Jul. 5, 1994

[54] MEANS FOR A SHOCK ABSORBER

[75] Inventors: Kenth Öhlin, Sollentuna; Tommy Malm, Norrahammer, both of Sweden

[73] Assignee: Ohlins Racing AB, Vasby, Sweden

[21] Appl. No.: 593,386

[22] Filed: Oct. 2, 1990

Related U.S. Application Data

[63] Continuation of Ser. No. 360,569, Jun. 2, 1989, abandoned, which is a continuation of Ser. No. 93,940, Sep. 8, 1987, abandoned, which is a continuation of Ser. No. 821,730, Dec. 4, 1985, Pat. No. 4,732,408.

[30] Foreign Application Priority Data

Apr. 4, 1984 [SE] Sweden ................. 8401874

[51] Int. Cl.$^5$ ............................................. B60G 11/26
[52] U.S. Cl. ..................................... 280/707; 188/319
[58] Field of Search ........... 188/319, 299, 285, 322.15, 188/320, 300; 267/64.12; 280/707, 714; 137/493.8, 493, 110

[56] References Cited

U.S. PATENT DOCUMENTS

| | | | |
|---|---|---|---|
| 1,929,791 | 10/1933 | Peo ........................................ | 188/299 |
| 1,954,196 | 4/1934 | Breer et al. ........................... | 188/299 |
| 2,637,414 | 5/1953 | Patriquin ........................... | 188/322.15 |
| 2,748,898 | 6/1956 | de Carbon ................. | 188/322.15 X |
| 3,174,587 | 3/1965 | Walton .............................. | 188/299 X |
| 3,807,678 | 4/1974 | Karnopp et al. ................ | 188/299 X |
| 3,995,883 | 12/1976 | Glaze . | |
| 4,030,580 | 6/1977 | Glaze . | |
| 4,065,154 | 12/1977 | Glaze .............................. | 188/299 X |
| 4,159,756 | 7/1979 | Murakami et al. .................. | 188/319 |
| 4,313,529 | 2/1982 | Kato et al. . | |
| 4,468,050 | 8/1984 | Woods et al. ........................ | 280/707 |
| 4,591,186 | 5/1986 | Ashiba ............................. | 188/299 X |
| 4,647,069 | 3/1987 | Iijima ................................. | 280/707 |
| 4,673,067 | 6/1987 | Munning et al. ..................... | 188/299 |

FOREIGN PATENT DOCUMENTS

| | | |
|---|---|---|
| 2911768 | 10/1980 | Fed. Rep. of Germany . |
| 3304833 | 8/1983 | Fed. Rep. of Germany . |
| 1095506 | 6/1955 | France ................. 188/319 |
| 1242350 | 8/1960 | France . |
| 623556 | 3/1958 | Japan . |
| 57-173629 | 10/1982 | Japan . |
| 57-173632 | 10/1982 | Japan . |
| 57-182506 | 11/1982 | Japan . |
| 116215 | 7/1983 | Japan ................... 188/299 |
| 379971 | 10/1975 | Sweden . |
| 1450765 | 9/1976 | United Kingdom . |
| 1485003 | 9/1977 | United Kingdom . |
| 2112104 | 7/1983 | United Kingdom . |
| 2117875 | 10/1983 | United Kingdom . |
| 2120355 | 11/1983 | United Kingdom . |

*Primary Examiner*—Robert J. Oberleitner
*Attorney, Agent, or Firm*—Pollock, Vande Sande & Priddy

[57] ABSTRACT

A shock-absorber includes a cylinder and a piston arranged within the cylinder and provided with at least one passageway of variable area for controlling flow of a working fluid from one side of the piston to the other side thereof. A controllable device is incorporated within the piston and continuously controlled by external control signals from a control unit to vary the area of the passageway. The external control signals are supplied by the control unit in response to input signals received from sensors which are associated with the shock-absorber. The input signals are related to the instantaneous parameter information obtained from the piston. The value of the external control signals varies during the stroke of the piston at least in part as a function of the input signals.

10 Claims, 2 Drawing Sheets

MEANS FOR A SHOCK ABSORBER

This application is a continuation of Ser. No. 360,569, filed on Jun. 2, 1989, now abandoned, which is a continuation of Ser. No. 093,940, filed on Sep. 8, 1987, now abandoned, which, in turn, is a continuation of Ser. No. 821,730, filed on Dec. 4, 1985, now U.S. Pat. No. 4,732,408.

TECHNICAL FIELD

The present invention relates to a means intended for a shock-absorber in order to permit variation of the shock-absorbing capacity of the shock-absorber by means of control impulses from an external control unit, for example in the form of or incorporating a computer. The shock-absorber in this case is of the kind which comprises a cylinder operating with fluid or fluid/gas. Arranged inside the cylinder is a piston provided with at least one passageway via which fluid is transferred from one side of the piston to its other side, and vice versa.

DESCRIPTION OF THE PRIOR ART

Shock-absorbers are used in a variety of applications where there is a requirement to absorb forces from a moving mass. By way of example, mention may be made of shock-absorbers for motor vehicles, for example motor cycles and motor cars, where the shock-absorber is fitted between a wheel and the chassis for the purpose of contributing to the optimum jolt-free movement of the chassis, in spite of any irregularities in the surface over which the vehicle is being driven. Another example is provided by the case in which rotating masses which are also subject to centrifugal forces must be provided with shock-absorption in relation to a solid surface.

Shock-absorbers provided with constant resistance or shock-absorbing capacity are previously known in the art. Known is a shock-absorber with replaceable or additional component parts to provide the optimum result with regard to the shock-absorbing capacity on each occasion on which the vehicle is driven.

Also known in the art is the provision of a variation in the shock-absorbing capacity with the assistance of an external control unit which may take the form of or may incorporate a computer unit or calculator, etc. This control unit can be supplied with information relating to the behaviour of the vehicle, which in turn is controlled by the actions of the driver. Thus, for example, the control unit may be supplied with information in respect of the speed of the vehicle, the torque being transmitted by the engine, and any changes in speed and inclination, etc. With the held of this information, the control unit is able to calculate the optimum shock-absorbing function for the shock-absorber at any given time and to control the shock-absorber in such a way that it will provide the shock-absorption determined by calculation.

SUMMARY OF THE INVENTION

Technical Problem

In systems with an external control unit it is desirable to be able to achieve a technically simple construction for the shock-absorber in which the variation function of the shock-absorber is integrated with the construction of the shock-absorber as a whole. In the case of motor cycles, for instance, it is desirable to be able to avoid external components which must form part of, or must be connected to, the shock-absorber. Thus, the aim is to achieve a construction for the shock-absorber which requires no external additions or other design changes because of the requirement for it to be provided with the aforementioned variation facility for its shock-absorbing capacity.

Solution

It is an object of the present invention to provide a means which will solve this problem amongst others. The new features of the present invention include provisions of a piston means capable of being controlled from the control unit and so arranged as to vary depending on the control impulses received from the control unit, the cross-sectional area of the passageway referred to by way of introduction, in so doing causing a variation to occur in the shock-absorbing capacity.

Further developments of the idea of invention are based on, the construction of the controllable means. Accordingly, this is intended in a preferred embodiment to be included in or to form an electrically controlled servo valve. This valve receives an electrical control signal from the external control unit and initiates a force-exerting flow of fluid dependent upon the control signal. This fluid flow acting upon a means to determine the size of the cross-sectional area of the passageway.

These further developments are also based on the manner in which a check valve arrangement must be executed in order to comply with the fundamental concept described above. Accordingly, each direction of flow through the piston must be provided with its own pair of check valves. Furthermore, in each of the directions of flow, fluid can be conducted via two parallel channels. A valve in the control means determines the flow of a control fluid in the first channel for the purpose of determining the position of a membrane which is utilized there. The membrane is in turn connected to a valve which determines the flow of a master fluid in the other channel.

The control means is activated from the external control unit through electrical connecting means which in this case may incorporate one or more electrical conductors which extend between the piston and the outside of the shock-absorber. The shock-absorber is provided with a sensor which transmit the necessary parameter information to the control unit. This parameter information may consist of information relating to position, movement and/or the direction of movement of the piston.

Preferably the control unit consists of a computer unit. In the event of the shock-absorber being fitted to a motor vehicle, the computer unit is supplied with information relating to the gas supply, the vehicle gearbox and/or the vehicle brakes, etc.

ADVANTAGES

According to the present invention the shock-absorber retains its neat construction and comparatively small external volume, despite the introduction of the facility to vary the shock-absorbing capacity. Furthermore, it is possible to achieve a reliable variation function with comparatively little power consumption, which is of great importance for motor vehicles.

DESCRIPTION OF THE DRAWINGS

A preferred embodiment of a means exhibiting the significant characteristic features of the invention is described below with simultaneous reference to the accompanying drawings, in which.

BEST MODE OF CARRYING OUT THE INVENTION

Figure 1:
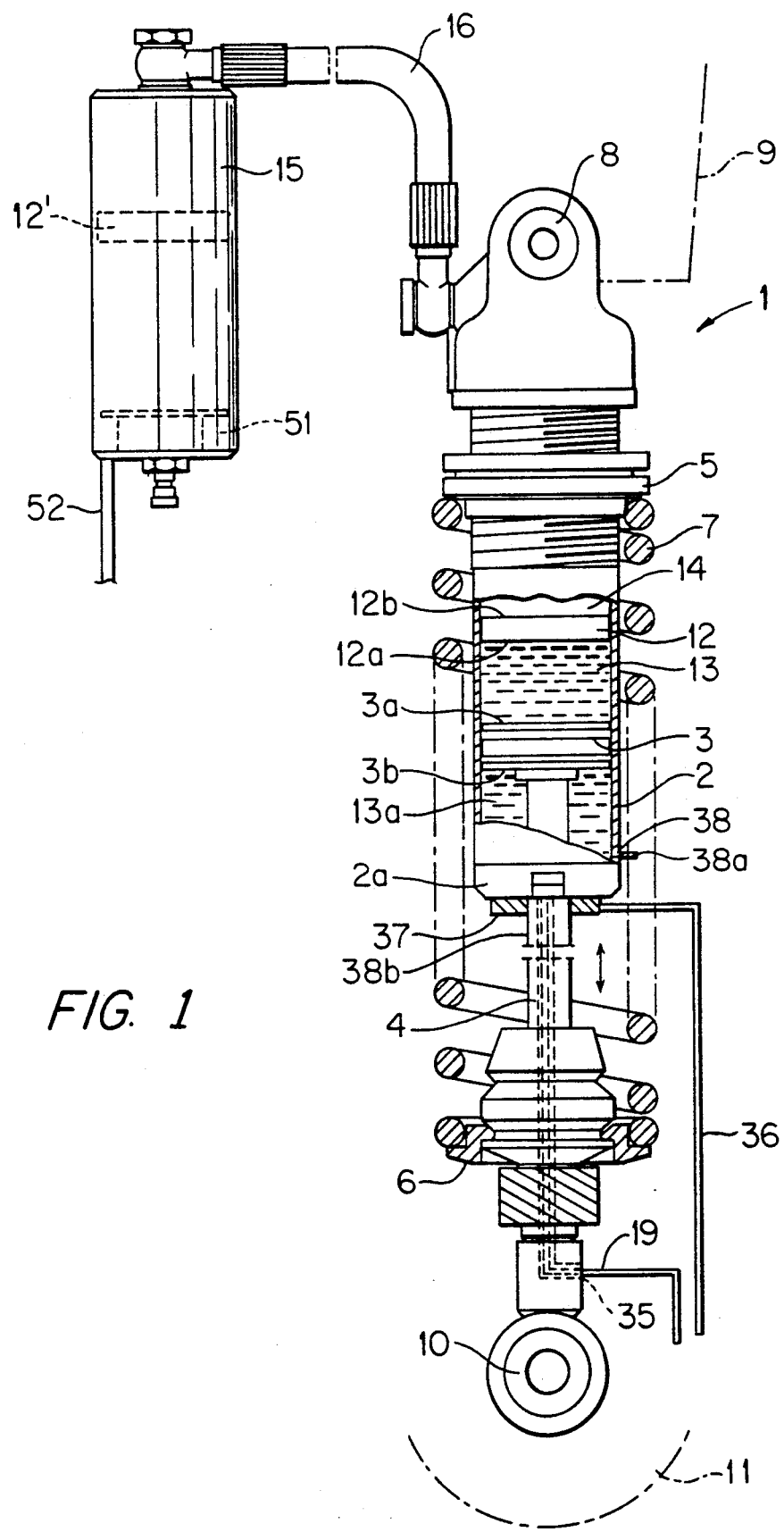
FIG. 1 shows a side view of a shock-absorber which operates with fluid/gas.

In FIG. 1 a shock-absorber is indicated by the reference numeral 1. The basic construction of the shock-absorber may be of a type known in the art. An example of such a shock-absorber is the Öhlins 'Gas Shocks' shock-absorber sold on the open market. A shock-absorber of this kind may incorporate a cylinder 2 and arranged inside it a piston 3 with its associated piston rod 4. Both the cylinder 2 and the piston rod 4 are provided with seatings 5 and 6 for a coil spring 7. The cylinder is provided with attachment members 8 for securing it to a chassis, indicated here by reference numeral 9. The piston rod is provided at its free end with a corresponding attachment 10 for securing it to, for example, a wheel 11. The seating 6 follows the movement of the piston rod.

In addition to the fixed piston 3 the shock-absorber of FIG. 1 is provided with a moving piston 12, which has one of its sides 12a facing towards a fluid 13 present inside the cylinder and its other side 12b facing towards a gas 14 present inside the cylinder. The gas side of the operating cylinder is connected to an accumulator 15 via a connection 16.

Since the basic function of the shock-absorber is already very familiar, it is not described in any greater detail here. Fixed piston 3 in accordance with FIG. 1 is provided with transcurrent passageways which make it possible for a fluid on one side 3a of the piston to pass through the piston to its other side 3b, and vice versa. The shock-absorption effect provided by the shock-absorber occurs, amongst other things, because of the presence of the fluid passageway which acts as a constriction between the sides 3a and 3b of the piston.

In accordance with the present invention, the fluid passageway must be variable. For this purpose a control means is arranged to vary depending on control impulses received from an external control unit (not shown) in FIG. 1, the cross-sectional area of the passageway between sides 3a and 3b of the piston. The control means in the present embodiment shown here can be activated by means of electrical signals from the control unit. The control means also operates with a servo function so that small control signals will cause and actuate the variation in the passageway. In the present embodiment the control means includes a control valve 17, preferably in the form of a conventional solenoid valve. The winding 18 in this solenoid valve is connected to the control unit by wires 19, being two in number in the embodiment shown.

Each direction of flow from one side to the other of the piston 3 is provided with its own pair of check valves. Thus the direction of flow from side 3a to side 3b is provided with the check valves 20 and 21. The other direction of flow is provided with these pair of check valves 22, 23. Two parallel flow channels 24, 25 and 26, 27 are arranged in said pairs of check valves. In addition the piston is provided with an internal space 28, inside which is arranged a membrane 29. To the membrane there is preferably securely attached a valve 30. Valve 30 is arranged in the flow channel 24, 25 which forms part of the main passageway between sides 3a and 3b of the piston. A needle 31 in the solenoid valve is arranged in the flow channel 26, 27 which forms a control passageway for the servo function of the controllable organ.

If, for example, the fluid pressure on side 3a exceeds the fluid pressure on side 3b of the piston, fluid will flow from the check valve 20 through passageways 24, 25 and 26, 27 as far as and then out through check valve 21 depending upon the manner in which needle 31 is regulated. A fluid flow corresponding to the setting of the needle will be formed in the channel 26, 27.

A force corresponding to the flow will act upon the membrane 29, which in turn will regulate the valve 30 in the channel 24, 25. If the needle 31 is actuated by the winding 18 to completely close the passageway 26, 27, no control flow will occur and the valve 30 will keep the channel 24, 25 completely closed. A small effect upon the needle will give rise to a small control flow, which in turn will produce a correspondingly small downward effect on the membrane as shown in the Figure, allowing valve 30 to open in channel 24, 25. A maximum effect on the needle 31 will produce a maximum control flow and a correspondingly maximum effect on the membrane and the valve 30, which will permit a maximum flow in the main channel 24, 25, and so on.

In the case of positive pressure being exerted on the side 3b of the piston in relation to the side 3a, the pair of check valves 22, 23 will enter into effect instead. Their function will be equivalent to that described above, but with the difference that the direction of flow in the main channel 24, 25 will be the opposite. The direction of flow from side 3a to side 3b is indicated by the arrows 32 and 32' in FIG. 1a, whereas the opposite direction of flow is indicated by the arrows 33, 33' in FIG. 1b. The direction of flow in the control channel is indicated by the arrows 34, 34' for both the flows referred to above in accordance with FIGS. 1a and 1b.

Membrane 29 is flexibly supported inside the space 28 by moving attachments 29a. These attachments may consist of suspension spring mountings of a previously disclosed kind, for example of a plastics material which is sufficiently strong to withstand the fluid contemplated, which may, for example, be hydraulic oil. The spring mounting of membrane 29 provides sealing between the lower and upper surfaces of the membrane so that the negative pressure produced by the control pressure is able to act upon the membrane in accordance with the present invention.

The pairs of check valves 20, 21 and 22, 23 may be in the form of check valves of a previously known kind. The passageways or channels can be provided by bores in the piston material. These bores being made in a previously known fashion.

It will be readily apparent to one skilled in the art that the above-described structure whereby the various flow channels, check valves, control valve, membrane, solenoid valve needle, control valve winding, etc. are all located within the confines of the shock absorber piston, make it possible to reduce to a minimum the lengths of the various fluid passages and thereby, of course, also minimize fluid friction losses and provide extremely low response times.

The wire or wires 19 is/are routed inside a central channel 4a in the piston rod 4. It is also possible to install the conductor or conductors on the outside of the piston rod 4. In FIG. 1 the outlet for the conductors 19 is represented by a side channel 35. The conductors are suspended in order to provide sufficient free play to permit maximum relative movement to take place between the piston rod and the cylinder. This suspension of the conductors may be accomplished in a previously known fashion without wear being caused to the conductors.

In accordance with the present invention, the shock-absorber will transmit a signal back to the external control unit. This signal will preferably inform the external control unit of the position of the shock-absorber in relation to the positions of the piston and the operating cylinder. This information is utilized by the external control unit to determine the speed of the movements between the chassis 9 and the unit 11, and the length of the suspension travel remaining until the respective end positions are reached, etc. The return signal may be transmitted via additional conductors 36 which may be one, two or more in number. In the embodiment shown, means 37 is arranged on the end surface 2a of the cylinder 21. Means 37 may be of a previously known kind which provides information on the speed of the relative movements of the piston and the cylinder. The cylinder may also be fitted with end position sensors 38 connected via conductors 38a to the external control unit. Only one end position sensor is shown in the Figure in the interests of clarity.

Figure 2:
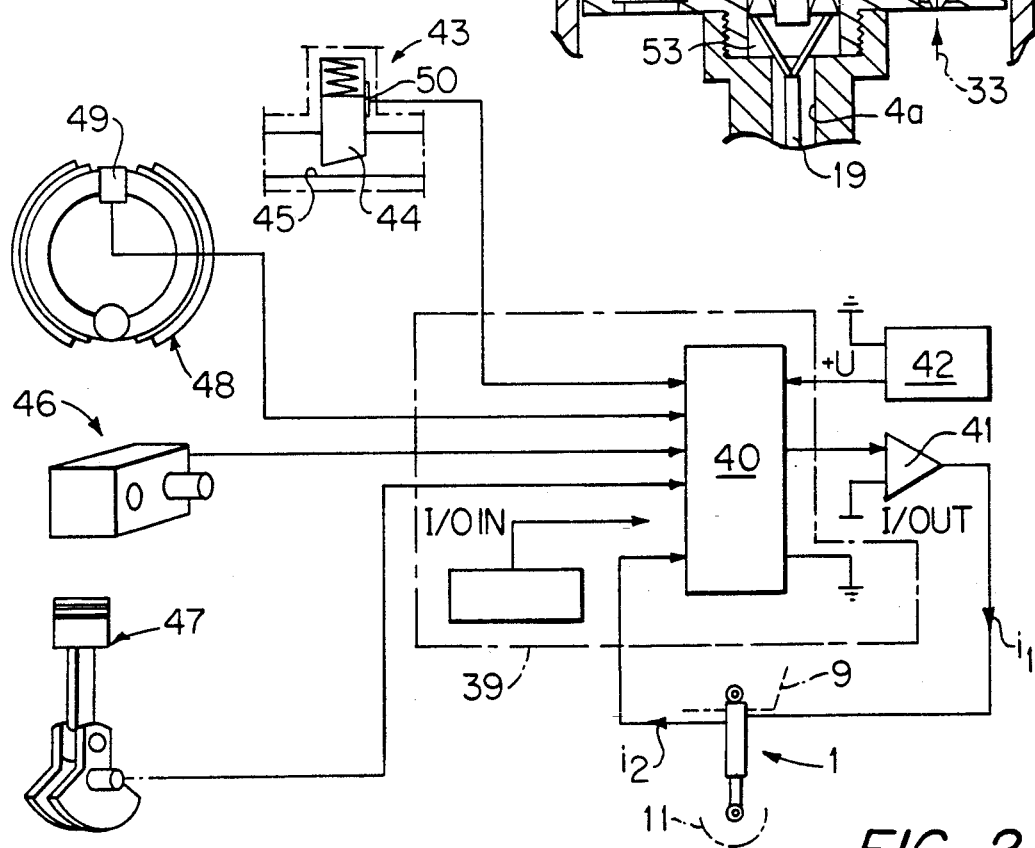
FIG. 2 shows in the form of a basic diagram the construction of the electronic component for the shock-absorber in accordance with FIG. 1.

The external unit 11 may be a microcomputer of a previously disclosed kind. The microcomputer is shown in FIG. 2 and may be installed in a suitable location on the vehicle. An example of the type of computer which may be used is the microcomputer sold on the open market by Motorola under the reference 6805. The microcomputer is identified in FIG. 2 by the reference numeral 39 and comprises a CPU 40 with its associated memories, for example ROM and RAM memories arranged in the same chip. The program which controls the shock-absorber is entered into the ROM memory. This memory can also contain stored constants holding the information required by the program for the control functions contemplated. Furthermore, the RAM memory may be used for random storage of calculation variables. The electronic equipment also includes a current amplifier 41 of a previously known kind. This amplifier is of the STD type and provides the control means 17, 18 with control signals. The current amplifier is an adapter circuit for matching the power requirement of the shock-absorber to the power output of the microcomputer. The power supply to the microcomputer is provided from the electrical generating means 42 of the vehicle. The microcomputer is connected to one or more means which provide information about the behavior of the vehicle, as determined by the driver. One example of a means which provides information is a gas supply system 43 which, by valve 44, controls the supply of fuel in a fuel line 45. Another example is provided by those parts of the vehicle which provide information about its speed; this may be the gearbox 46 of the vehicle, in which case information can be obtained both from the position of the gear lever 47 and from rotating units inside the gearbox. A third information-providing means which may be of interest in this context is one or more of the brakes 48 of the vehicle. Each of means 43, 46 and 48 is fitted with one or more sensors 49, 50 to provide the required information.

In the Figure the control signal from the microcomputer 40 to the shock-absorber is indicated by $i_1$, whilst the return signal from the shock-absorber to the microcomputer is indicated by $i_2$.

With the help of the sensor, information is supplied to the microcomputer. On the basis of this information the computer is then able to determine by, for example, the speed of the vehicle, the torque being transmitted by the engine, and any change in speed (acceleration or retardation), the behaviour of the vehicle caused by the influence of the driver. With these quantities or parameters the microcomputer is able by activating the control means to adjust the resistance or the shock-absorbing capacity of the shock-absorber to achieve optimum function at any given moment. The speed at which information is transmitted between the microcomputer and the shock-absorber can be high, and may, for example, reach 100,000 pieces of information per second. The execution and number of the sensors used in various applications may vary within wide limits. The objective, however, is to provide the microcomputer at all times with sufficient information on the driver's actions or intentions in order to utilize optimum vehicle performance.

Due to the present invention, it is possible to link the resistance of the shock-absorber to this driver/vehicle performance. The resistance of the shock-absorber need not be limited to a number of different factors specified at the time of manufacture, but may now be optimized on a continuous basis. This means that considerable improvements can be achieved in road-holding in many different respects, for example one or more, or all of the following functions: better braking ability, better acceleration and/or better cornering ability, etc.

The sensor may incorporate code discs 38b on the outside of the piston rod 4. The positions of these code discs can be scanned by means of means 37, for example with the help of photo-transistors.

As an alternative to, or in addition to the sensors 37, 38, the sensing of the position and/or the speed of the piston in relation to the cylinder 2 can be performed by monitoring the pressure by use of a pressure-monitoring means 51 connected to the external control unit by conductors 52, which may, for example, be two in number. The pressure-monitoring means 51 can be of a previously known kind. The variations in pressure due to the relative movements between the piston and the cylinder 2 are monitored at very closely-spaced intervals by the microcomputer, which calculates the speeds/positions of the piston relative to the cylinder.

The piston 12 is positioned inside the cylinder 2 if the accumulator 15 is not present. If the accumulator 15 is present, then this will instead constitute the moving piston 12', in which case the piston 12 in the cylinder may be omitted. The pressure means 51 is positioned inside the cylinder 2 if the accumulator is not present.

Figure 1A:
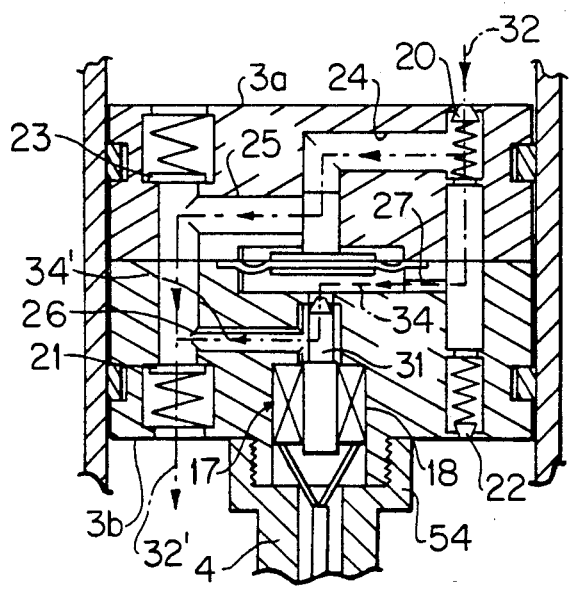
FIG. 1a shows a sectional view on an enlarged scale of the construction of a piston in the shock-absorber in accordance with FIG. 1 and a first fluid flow from the first side of the piston to its second side.
Figure 1B:
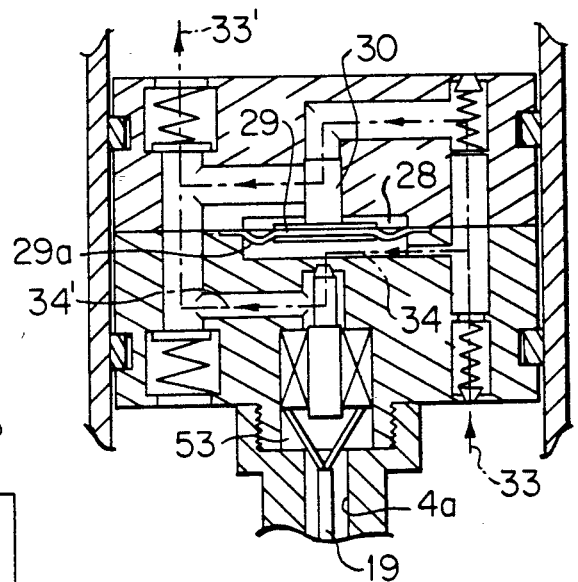
FIG. 1b shows the construction of the piston of FIG. 1, but with a second fluid flow from the second side to the first side of the piston.

The solenoid valve 17 is positioned in a recess 53 (FIG. 1b) which is covered by a combined covering and retaining means 54 (FIG. 1a). The piston also exhibits a parting plane, and the parts of the piston are held together in a previously known, but not illustrated, fashion, for example by means of bolts.

The control means has a protected position inside the piston. It is not exposed to the main fluid between the upper and under sides of the piston. The control means is able to control the control passage essentially independent of the pressure difference between the upper and under surfaces of piston, at least in the normal operating conditions.

The invention is not restricted to the embodiment shown above by way of example, but may undergo modifications within the context of the following patent claims and the idea of invention.

We claim:

1. A shock-absorber for a vehicle connected between a wheel assembly and the vehicle chassis and comprising in combination:
    a cylinder, a piston slidably mounted within said cylinder, and means for securing one of said cylinder and piston to the wheel assembly and the other to the chassis, said cylinder defining first and second volumes on the opposite sides of said piston each containing a fluid for controllably dampening movement of said piston in said cylinder;
    at least one main fluid flow path for conveying fluid between said first and second volumes in a first direction of flow and for conveying fluid between said second and first volumes in a second opposite direction, the direction of fluid flow in said at least one fluid flow path being at each instant dependent upon whether the pressure in said first volume is greater or less than in said second volume;
    at least one control flow passageway extending between said first and second volumes, and means governed at least in part by the difference in pressures between said first and second volumes for generating a control pressure at a predetermined location in said control flow passageway;
    valve means for infinitely varying the resistance to fluid flow in said at least one main fluid flow path;
    first means responsive to at least one vehicle operating parameter for generating a repetitive signal having a manifestation on each occurrence thereof which corresponds to the instantaneous optimum desired dampening of said shock absorber, said signal having a repetition rate sufficiently high to ensure the generation of a plurality of said signals during a single cycle of reciprocation of said piston in said cylinder;
    and second means responsive jointly to at least said manifestation of said repetitive signal and also to the magnitude of said control pressure at said predetermined location for controlling said valve means to infinitely vary the resistance to fluid transfer over said at least one main fluid flow path;
    each of said main fluid flow path, said control flow passageway, said means for generating a control pressure, said valve means for infinitely varying the resistance to fluid flow, and said second means being incorporated within the confines of said piston to thereby minimize the length of the fluid flow passageways, minimize friction losses, and reduce the responsive time of the shock absorber.

2. The apparatus of claim 1 in which said second responsive means includes a diaphragm means, means coupling said diaphragm means to said valve means, and means including a control valve responsive at least in part to said repetitive signal for variable controlling the magnitude of the fluid pressure acting upon said diaphragm means to thereby control the rate of fluid flow between said first and second volumes.

3. The apparatus of claim 2 wherein said control fluid flow path is arranged to cause a flow of fluid therein which is in the same direction irrespective of which side of said piston has the greater fluid pressure acting thereupon.

4. The apparatus of claim 1 in which said at least one main fluid flow path comprises first and second main fluid flow paths which are common to each other over at least a portion of their lengths.

5. The apparatus of claim 1 in which said control flow passageway has at least a portion thereof which is common with said at least one main fluid flow passageway.

6. A shock-absorber for a vehicle connected between a wheel assembly and the vehicle chassis and comprising in combination:
    a cylinder, a piston slidably mounted within said cylinder, and means for securing one of said cylinder and piston to the wheel assembly and the other to the chassis, said cylinder defining first and second volumes on the opposite sides of said piston each containing a fluid for selectively dampening movement of said piston in said cylinder;
    a first main fluid flow path for conveying fluid between said first and second volumes in a first direction of flow and a second main fluid flow path for conveying fluid between said second and first volumes in a second opposite direction, the direction of fluid flow in said first and second fluid flow paths being at each instant dependent upon whether the pressure in said first volume is greater or less than in said second volume;
    at least one control flow passageway extending between said first and second volumes, and means governed at least in part by the difference in pressures between said first and second volumes for generating a control pressure at a predetermined location in said control flow passageway;
    valve means for infinitely varying the resistance to fluid flow in both said first and second main fluid flow paths;
    first means responsive to at least one vehicle operating parameter for generating a repetitive signal having a manifestation on each occurrence thereof which corresponds to the instantaneous optimum desired dampening of said shock absorber, said signal having a repetition rate sufficiently high to ensure the generation of a plurality of said signals during a single cycle of reciprocation of said piston in said cylinder; and,
    second means responsive jointly to at least said manifestation of said repetitive signal and also to the magnitude of said control pressure at said predetermined location for controlling said valve means to infinitely vary the resistance to fluid transfer over said at least one main fluid flow path;
    said piston incorporating substantially entirely within its confines said first and second fluid flow paths, said control flow fluid passageway, said valve means, and said second responsive means.

7. The apparatus of claim 6 in which said first and second fluid flow paths have a common portion and said valve means varies the resistance to fluid flow in said common portion.

8. The apparatus of claim 6 in which said second responsive means includes a diaphragm means, means coupling said diaphragm means to said valve means, and means including a control valve responsive at least in part to said repetitive signal for variably controlling the magnitude of the fluid pressure acting upon said diaphragm means to thereby control the rate of fluid flow between said first and second volumes.

9. The apparatus of claim 9 wherein said control fluid flow path is arranged to cause a flow of fluid therein which is in the same direction irrespective of which side of said piston has the greater fluid pressure acting thereupon.

10. The apparatus of claim 8 in which said first and second main fluid flow paths in said piston are common to each other over at least a portion of their lengths.

* * * * *